April 21, 1964   D. A. CHURCH   3,129,847
PRESSURE CONTROLLED BALLASTER
Filed May 16, 1961   2 Sheets-Sheet 1

INVENTOR.
DAVID A. CHURCH
BY Allen M. Sutton

ATTORNEY

*INVENTOR.*
DAVID A. CHURCH
BY *Allen M. Sutton*

ATTORNEY

United States Patent Office 3,129,847
Patented Apr. 21, 1964

3,129,847
PRESSURE CONTROLLED BALLASTER
David A. Church, Coon Rapids, Minn., assignor, by mesne assignments, to Litton Systems, Inc., Beverly Hills, Calif., a corporation of Maryland
Filed May 16, 1961, Ser. No. 110,579
9 Claims. (Cl. 222—52)

The present invention relates to a dispensing apparatus, and more particularly to a liquid ballast dispensing apparatus designed to release a fluid medium from a container, in response to a relative change in ambient pressure.

Oft times a balloon is launched with the intention of maintaining it at a substantially constant altitude within a desired altitude range, regardless of ambient pressure or temperature changes. Ambient pressure and temperature change over a period of time, will cause expansion or contraction of the gas within the balloon, which in turn will cause it to ascend or descend from a given altitude. The ascension of the balloon due to expanding gases can be controlled by providing means for venting the excess gas out of the balloon. On the other hand, in order to control a premature descent of the balloon, which might be caused by contraction of the gases due to a pressure or temperature change, leakage of gas through the balloon fabric or the like, means have been used for dropping ballast from the balloon.

According to the known state of the art, ballast dropping systems have been either manually controlled, electrically controlled, or mechanically controlled. These systems have not been entirely satisfactory. For example, a manually controlled system requires the actual presence of the operator; an electrically controlled system requires the necessity of electrical equipment to actuate the valve means; and a mechanically controlled system has been relatively complex.

Accordingly, one object of the present invention is to provide a ballast dispensing apparatus which can be used to effectively maintain a balloon at a substantially constant altitude during changing ambient conditions.

Another object is to provide a ballast dispensing apparatus which will prevent a floating balloon from descending more than a nominal amount below its floating altitude.

A further object is to provide a ballast dispensing apparatus which is light in weight and relatively simple in construction.

Another object is to provide a ballast dispensing apparatus which will release a fluid medium automatically when an increase in pressure occurs, the rate of releasing being proportional to the amount of pressure increase.

A still further object is to provide a liquid dispensing ballaster which will prevent the ballast from being released while the apparatus is subject to a first pressure, but which will permit said ballast to be released while the apparatus is subject to a higher pressure.

Other objects and advantages of the invention will become apparent from a consideration of the following specification and accompanying drawings. However, before proceeding with a detailed description of my invention, a brief description of it will be presented.

In general, my invention will maintain a balloon at a reasonably constant altitude within a prescribed altitude range. Since a balloon may lose its relative buoyancy at sunset, my ballaster unit will counteract the loss of altitude by releasing a certain amount of ballast. For example, the ballaster is constructed so that as the balloon rises from ground level to a preset altitude within a certain range, no ballast is released. After the balloon has once attained its maximum altitude, a loss of altitude will permit the liquid ballast to be released. Upon releasing a given amount of the liquid ballast the balloon may cease its descent and float at constant altitude or ascend to a higher altitude. If the balloon does not ascend, loss of ballast continues; eventually, if the balloon again ascends, an altitude increase equivalent to the altitude loss will cause the flow of liquid ballast to stop.

The invention will best be understood by a reference to the following drawings, wherein.

Figure 1:
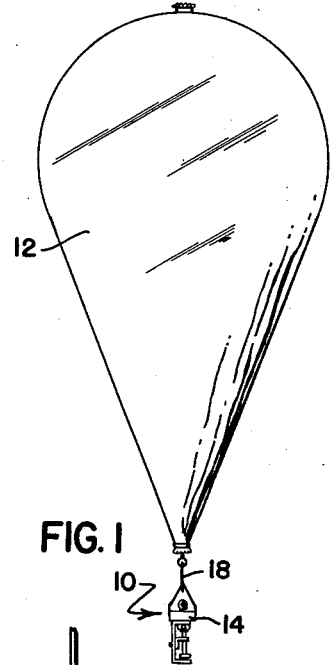
FIGURE 1 is a side elevational view of a balloon with a pressure controlled ballaster.

FIGURE 1 illustrates a pressure controlled ballaster, designated generally by reference numeral 10, attached to a balloon 12 by means of cable 18.

Figure 2:
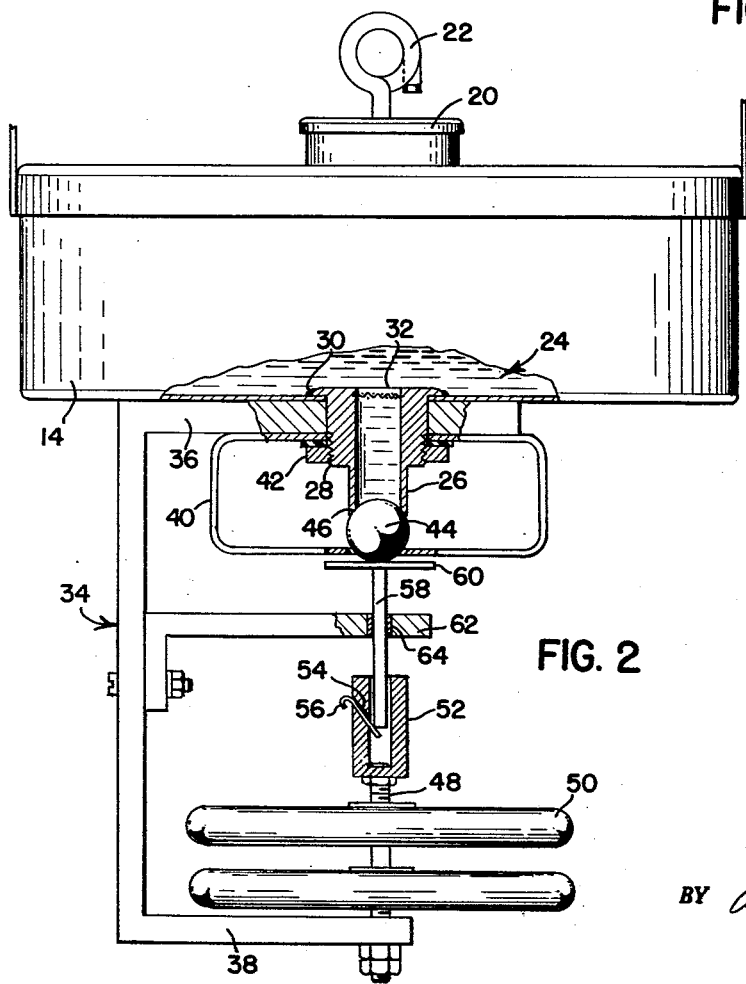
FIG. 2 is a partial schematic elevational view of the ballaster illustrating one embodiment of my invention.

FIGURE 2 illustrates one embodiment of the ballaster shown in FIGURE 1. The ballaster is comprised of a container 14 for holding a fluid medium, such as liquid ballast, and is provided with inlet means 20, vent 22, and outlet means 24.

Outlet means 24 includes a discharge tube 26, having a threaded portion 28 thereon. A seal 30 is provided to prevent leakage of the fluid medium about the outlet means. A filter 32 prevents impurities such as direct particles, from entering the discharge tube. A U-shaped frame member 34, having arms 36 and 38, and a ball retainer 40 are securely attached to the discharge tube 26 by means of a nut and washer assembly 42, which engages the threaded portion 28 of the tube. Retainer 40 positions a ball or sphere 44 in relative proximity to an orifice 46 at the lower end of the discharge tube 26. Sphere 44 acts as a valve means for controlling the flow of the fluid medium through the discharge tube. This feature will be described in greater detail hereinafter.

Attached to the arm 38 of member 34 is an aneroid cell shown in the form of a set of bellows 50. Threaded on to a projection 48, which is rigidly connected to bellows 50, is a sleeve or retainer 52. Positioned within a slit or opening 54 in the sleeve 52 is a wire spring 56, which extends into the interior of said sleeve. A shaft 58, having a head or anvil 60, is adapted to be telescopically inserted into the sleeve 52. The head 60 is adapted to abut against sphere 44 as the bellows expands. A support member 62, having a bushing 64 is attached to the frame 34 and provides a guide means for shaft 58.

Prior to launching of the balloon, container 14 is filled with a ballast fluid. While I have not designated a particular type of ballast fluid to be used, it is envisioned that any type of ballast fluid having a low freezing point might be used. In order to prevent premature releasing of the ballast fluid, the valve means is closed; that is, sphere 44 is abutted against the orifice 46 of discharge tube 26, thus preventing ballast from being released. Shaft 58 and more particularly head 60, is also in abutting relationship to sphere 44. Shaft 58 is urged upwardly, that is, toward the sphere 44, by means of spring 56 which is positioned in sleeve 52; spring 56 biases the shaft upwardly by engaging the bottom of said shaft. In order to assure a sufficient upward force by said shaft 58 against the sphere 44, sleeve 52 may be adjusted by rotating it about the threaded portion of projection 48, and thereafter locking it in a desired relative position so that spring 56 urges shaft 58 against sphere 44.

Figure 3:
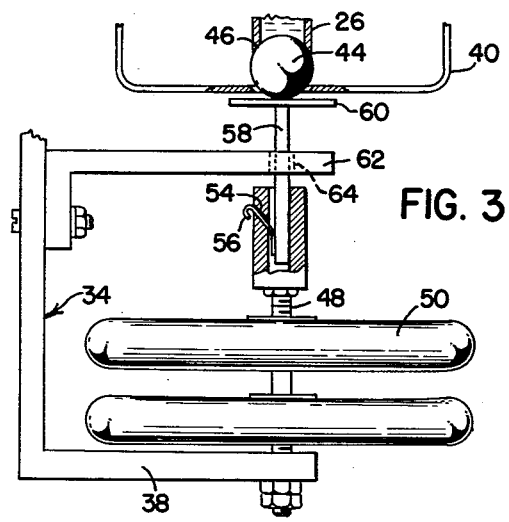
FIG. 3 is a partial schematic view of the ballaster of FIG. 2 illustrating said ballaster in a different operating condition.

As the balloon ascends and the ambient pressure decreases, the valve is held closed by the expanding bellows 50, sleeve 52, shaft 58 and sphere 44. A sufficient biasing action is provided by the wire spring to furnish a good seal and to cause a slight loading on the bellows. This loading is important for holding the valve closed when the balloon is at ceiling. As the bellows 50 expands, shaft 58 telescopes into sleeve 52 thus causing spring 56 to disengage the bottom of shaft 58 and contact the side of the shaft, as shown in FIGURE 3. While the spring is in this position it is biased against the side of the shaft in such a manner that when the bellows contracts, e.g., during a loss of altitude, the shaft 58 and the head 60 will move away from the sphere 44 and the valve means will be opened, thus permitting ballast to be released. In this connection it might be added that normally a small loss of altitude occurs before the bellows contracts, because the bellows in its expanded condition acts somewhat like a spring, and a slight loss in altitude will not generally result in an instantaneous contraction of the bellows. Therefore, the balloon will normally descend a slight amount before a large enough change in pressure occurs to cause the bellows to contract. The rate at which ballast is released, depends on the relative separation of orifice 46 from sphere 44. In other words, a slight contraction of bellows 50 will permit only a nominal amount of ballast to be released, whereas a larger contraction, which separates orifice 46 from sphere 44, will permit a larger amount of ballast to be released.

Figure 6:
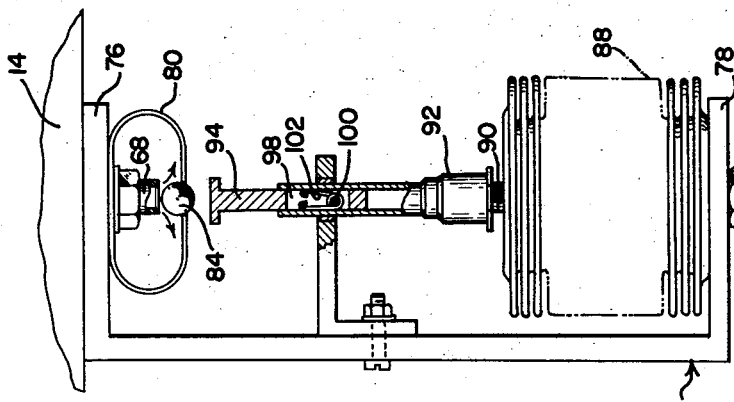
FIG. 6 is a partial schematic view illustrating the ballaster of FIG. 4 in a still different operating condition.
Figure 5:
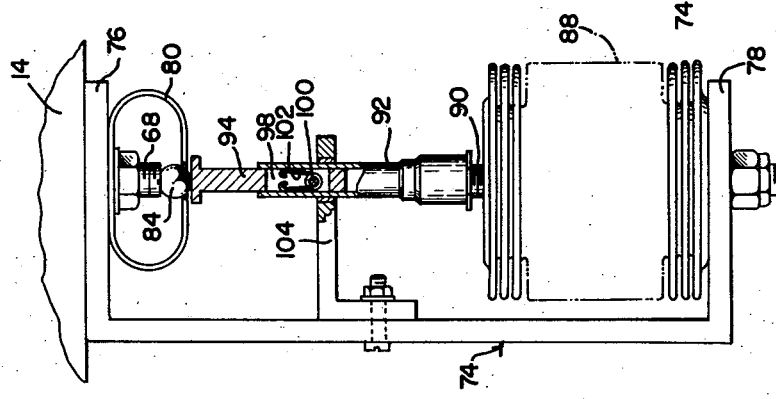
FIG. 5 is a partial schematic view of the ballaster of FIG. 4 but illustrating said ballaster in a different operating condition.
Figure 4:
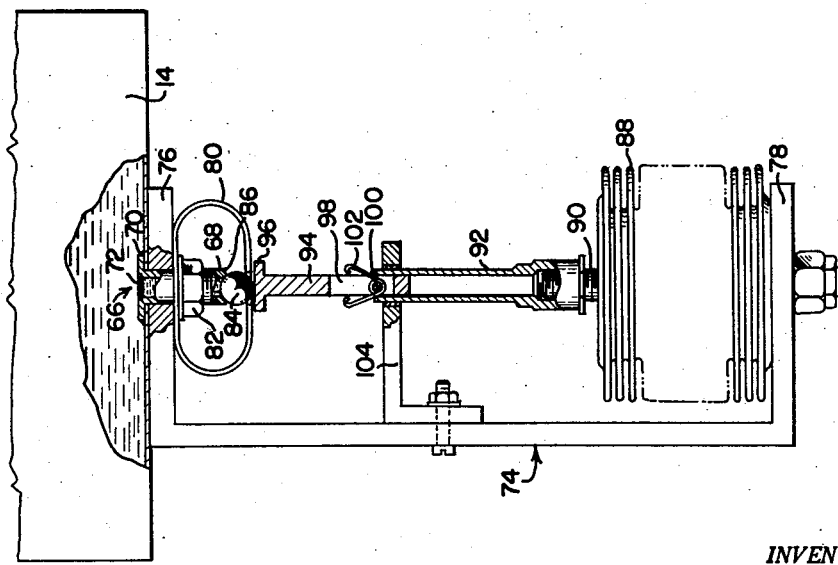
FIG. 4 is a partial schematic elevational view illustrating another embodiment of my invention.

The ballaster illustrated in FIGS. 4–6 is similar to that of FIGURE 2, but illustrates a different embodiment of my invention.

In this embodiment, container 14 is provided with outlet means designated generally by reference numeral 66, which includes a discharge tube 68 sealed as at 70 to the container 14. Filter 72 prevents particles from entering the discharge tube. A U-shaped frame member 74, having arms 76 and 78, and a ball retainer 80 are secured to the outlet means by a nut and washer assembly 82. Positioned within the retainer 80 is a sphere 84 which abuts against an orifice 86 in the lower end of tube 68 and acts as a valve for controlling the flow of ballast from the container.

A bellows 88 is attached to the lower arm 78, and a sleeve 92 is connected to the bellows 88 by means of a threaded projection 90 which is rigidly connected to the bellows. Adapted to be telescopically inserted into sleeve 92 is a shaft 94 having a head 96, the head in turn being adapted to abut against the sphere 84. Positioned within an opening in the shaft 94 by means of a pin 100, is a sear spring 102. A support member 104 secured to the frame 74 acts as a guide means for sleeve 92.

The manner of releasing ballast in this embodiment is similar to that of the embodiment shown in FIGURE 2. FIGURES 4–6 illustrate different stages of the ballaster during flight. Prior to launch, sleeve 92 is positioned by rotating it relative to projection 90, so that its top edge contacts and slightly compresses the arms of sear spring 102, as noted in FIGURE 4. Sleeve 92 is locked in this position by appropriate means. During this stage, shaft 94 and head 96 are forced against sphere 84, thus preventing fluid from being dispensed from the container 14.

As the balloon ascends and the bellows 88 expands, sphere 84 remains forced against orifice 86, thus preventing leakage of the ballast fluid through discharge tube 68. Continued expansion of bellows 88 causes shaft 94 to telescope into sleeve 92, until the top of sleeve 92 extends above the spring 102, as shown in FIGURE 5. Spring 102 is biased outwardly and frictionally engages the inner surface of sleeve 92, and remains in a somewhat locked position relative to said sleeve.

FIGURE 6 illustrates the ballaster after a descent of the balloon has occurred. The bellows 88 has resumed a somewhat contracted condition and shaft 94 is now retained within the sleeve 92. Ballast is now released through the outlet means.

The rate at which the ballast fluid is dispensed depends to a certain degree on the amount of altitude loss, since the degree of relative separation of the head member from the sphere depends on a relative contraction of the pressure sensitive bellows. During operation, after the removal of a certain amount of ballast, the descent of the balloon may cease and consequently the bellows will no longer contract. If the balloon now ascends again and the bellows expands sufficiently far to cause the coupling means, e.g., shaft, sleeve, head, etc., to force the sphere against the orifice of the discharge tube, additional loss of the ballast fluid will be prevented.

In the above description a disclosure of the principles of this invention is presented, together with some of the embodiments in which the invention may be carried out. Of course, the invention is to be limited only by the scope of the appended claims.

I claim:

1. A pressure controlled ballaster comprising in combination a container for holding a fluid medium, outlet means in said container, means for controlling the passage of fluid medium through said outlet means, pressure responsive means, and coupling means between said pressure responsive means and said fluid controlling means, said coupling means including an elongated sleeve attached to said pressure responsive means, an elongated shaft adapted to be inserted in said sleeve and movable relative thereto, and biasing means for urging said shaft out of said sleeve and against said fluid controlling means.

2. A pressure controlled ballaster comprising in combination a container for holding a fluid medium, outlet means in said container, means for controlling the passage of fluid medium through said outlet means, said means including a spherical member adapted to be forcibly abutted against an orifice of the outlet means, pressure responsive means, and coupling means operatively connecting said pressure responsive means to said abutting member, said coupling means including an elongated sleeve attached to said pressure responsive means, an elongated shaft adapted to be inserted in said sleeve and relatively movable thereto, and biasing means for urging a projecting end of said shaft against said abutting spherical member, thereby forcing said member against the orifice when the fluid medium is to be retained within the container.

3. The combination of claim 2 wherein the sleeve is adjustably attached to the pressure responsive means.

4. A pressure controlled ballaster comprising in combination a container for holding a fluid medium, outlet means in said container, means for controlling the passage of fluid medium through said outlet means, said means including a spherical member which abuts against an orifice of the outlet means, pressure responsive means, and coupling means operatively associating said pressure responsive means with said spherical member, said coupling means including an elongated sleeve adjustably attached to said pressure responsive means, an elongated shaft adapted to be inserted in said sleeve, said shaft being movable relative to said sleeve, said shaft having a head member attached to a projecting end thereof, and spring means for biasing the head of said shaft against said spherical member.

5. The combination of claim 4 wherein said sleeve is provided with a slot, and the spring means comprises a wire spring inserted within said slot to project into said sleeve whereby one end theerof engages the inserted end of the shaft.

6. The combination of claim 4 wherein said shaft is provided with an opening, and said spring means comprises a sear spring positioned within the opening in said shaft, and means for securing said sear spring in said opening.

7. A pressure controlled ballaster comprising in combination a container for holding a fluid medium, outlet means in said container, means for controlling the passage of fluid medium through said outlet means, said controlling means including a spherical member which abuts against an orifice of said outlet means, pressure responsive means, and coupling means operatively connecting said pressure responsive means to said spherical member, said coupling means including an elongated sleeve adjustably attached to said pressure responsive means, an elongated shaft adapted to be inserted in said sleeve and relatively movable thereto, said shaft having a head member attached to a projecting end thereof, said head member abutting against said spherical member, and biasing means adapted to urge said shaft toward said spherical member while said pressure responsive means is subjected to a first pressure and further adapted to prevent movement of said shaft relative to said sleeve while said pressure responsive means is subjected to a second pressure.

8. A pressure controlled ballaster comprising in combination a container for holding a fluid medium, outlet means in said container, means for controlling the passage of fluid medium through the outlet means including a member adapted to be forcibly abutted against an orifice of said outlet means, and pressure responsive means operatively associated with said abutting member for maintaining said member in a desired relative position with respect to said outlet means, said pressure responsive means positioned so as to force the abutting member against the orifice when the fluid medium is to be retained within the container, said pressure responsive means causing the abuting member to be moved relative to the orifice in response to a change in the atmospheric pressure.

9. A pressure controlled ballaster comprising in combination a container for holding a fluid medium, outlet means in said container, means for controlling the passage of fluid medium through said outlet means including a member adapted to be forcibly abutted against an orifice of said outlet means, pressure responsive means, and coupling means operatively connecting said pressure responsive means to said member which abuts against the orifice, said pressure responsive means positioned so as to force the abutting member against the orifice when the fluid medium is to be retained within the container, said pressure responsive means causing the abutting member to be moved relative to the orifice thereby controlling the passage of the fluid medium through the outlet means in response to a change in the atmospheric pressure.

References Cited in the file of this patent

UNITED STATES PATENTS

| | | |
|---|---|---|
| 2,004,715 | Thwaits | June 11, 1935 |
| 2,730,626 | Varney | Jan. 10, 1956 |
| 2,895,652 | Rockriver | July 21, 1959 |
| 2,900,149 | Winzen et al. | Aug. 18, 1959 |
| 2,904,285 | Huch | Sept. 15, 1959 |
| 2,924,403 | Yost | Feb. 9, 1960 |